United States Patent [19]

Ando et al.

[11] 4,119,985
[45] Oct. 10, 1978

[54] VIEW FINDER FOR REFLEX CAMERA

[75] Inventors: Yoshikazu Ando, Musashino; Junichi Yokozato, Kawagoe, both of Japan

[73] Assignee: Zenza Bronica Industries, Inc., Tokyo, Japan

[21] Appl. No.: 737,567

[22] Filed: Nov. 1, 1976

[30] Foreign Application Priority Data

Nov. 4, 1975 [JP] Japan ............................ 50-150092[U]
Nov. 11, 1975 [JP] Japan ............................ 50-153079[U]

[51] Int. Cl.² ........................ G03B 13/02; G03B 19/12
[52] U.S. Cl. .................................... 354/223; 354/155
[58] Field of Search ............... 354/219, 223, 224, 225, 354/155, 152

[56] References Cited

U.S. PATENT DOCUMENTS

| 2,468,814 | 5/1949 | Coutant et al. ............... 354/223 X |
| 3,250,195 | 5/1966 | Maitani ............................ 354/155 |
| 3,819,255 | 6/1974 | Matui ........................... 354/225 X |
| 3,845,699 | 11/1974 | Feng ................................ 354/155 |

FOREIGN PATENT DOCUMENTS

| 208,251 | 5/1957 | Australia .................................... 354/224 |
| 746,421 | 8/1944 | Fed. Rep. of Germany .......... 354/155 |
| 1,011,638 | 7/1957 | Fed. Rep. of Germany .......... 354/224 |
| 2,435,788 | 2/1976 | Fed. Rep. of Germany .......... 354/223 |
| 1,293,087 | 4/1961 | France ...................................... 354/152 |

*Primary Examiner*—Donald A. Griffin
*Attorney, Agent, or Firm*—Harold L. Stults

[57] ABSTRACT

A view finder mounted on a focusing plate of a reflex camera in which light coming through a taking lens of the camera is reflected upward by a mirror and an image of the object is focused on a focusing plate horizontally located above the mirror. A first mirror is provided above the focusing plate to reflect the light from the focusing plate in parallel to the optical axis of the taking lens of the camera. A second mirror is provided optically behind the first mirror to reflect the light from the first mirror at right angle upwardly or sidewardly. The second mirror is rotatable at right angle about the optical axis of the light from the first mirror to change the direction of reflection. Either the first or second mirror has a roof prism to reverse the right and left of the image reflected thereby. Behind the second mirror is located a magnifier through which the image can be viewed.

6 Claims, 6 Drawing Figures

VIEW FINDER FOR REFLEX CAMERA

BACKGROUND OF THE INVENTION

1. Field of the Invention

This invention relates to a view finder for a reflex camera, and more particularly to a view finder adapted to a reflex camera which has a rectangular image frame.

2. Description of the Prior Art

In a camera which has a rectangular image frame, it is sometimes required to change the position of the camera. For instance, when horizontally extending wide scenery is to be photographed, the camera body is held vertically in its natural or normal position (hereinafter referred to as "vertical position"). When a tall tower or a vertically long object is to be photographed, the camera body is turned sideways to make the image frame have its long sides in the vertical direction (hereinafter referred to as "sideways position"). The camera body is normally held in its vertical position wherein the focusing plate is faced upward to be seen from above.

It has been known in the art to provide a view finder on the reflex camera which comprises a first mirror located above the focusing plate of the camera to reflect the light from the focusing mirror backward in parallel to the focusing plate, a second mirror located behind the first mirror to reflect the light from the first mirror at right angle, said second mirror being rotatable about the optical axis of the light from the first mirror, and a magnifier located above the second mirror to see the image focused on the focusing plate therethrough. When the conventional view finder as described above is used, the image of an object to be photographed can be viewed through the magnifier as an erecting image regardless of the position of the camera by rotating the second mirror together with the magnifier about the optical axis of the light from the first mirror. When the camera is turned from the vertical position to the sideways position, the second mirror and the magnifier are rotated about the optical axis of the light from the first mirror by 90°. However, the conventional view finder for the reflex camera as described above is disadvantageous in that the image viewed through the magnifier is a mirror image, i.e. the right and left are reversed.

SUMMARY OF THE INVENTION

In view of the above mentioned disadvantage of the conventional view finder, the primary object of the present invention is to provide a view finder for a reflex camera in which the image focused on the focusing plate of the camera is viewed through the magnifier thereof as an erecting and non-mirror image.

It is a specific embodiment of the present invention to provide a view finder for a reflex camera which enables the viewing of the focused image as an erecting and non-mirror image whether the camera is in the vertical position or the sideways position.

The view finder in accordance with the present invention is characterized in that the first or second mirror used in the conventional view finder system as described hereinabove has a roof mirror. In other words, the view finder in accordance with the present invention comprises a first mirror located above the focusing plate of the camera to reflect the light from the focusing plate at right angle is parallel to the optical axis of the taking lens of the camera, a second mirror located behind the first mirror to reflect the light from the first mirror at right angle, said second mirror being rotatable by 90° about the optical axis of the light from the first mirror, said first mirror or said second mirror having a roof mirror to reverse the right and left of the image reflected thereby, and a magnifier located behind said second mirror to see the image focused on the focusing plate therethrough. Said second mirror may be rotated 90° or demountably attached to the view finder system selectively at two positions which are angularly separated by 90°. In the specification, the rotation and the discrete rotation are both referred to as rotation of the second mirror.

DESCRIPTION OF THE PREFERRED EMBODIMENTS

Figure 1:
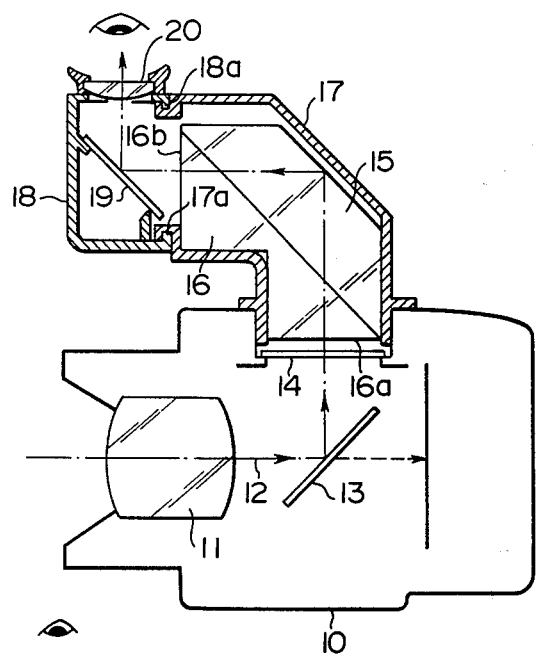
FIG. 1 is a somewhat schematic vertical sectional view showing a first preferred embodiment of the view finder in accordance with the present invention.

Referring to FIG. 1 which shows a first embodiment of the view finder in accordance with the present invention mounted on a single lens reflex camera, a camera body 10 is provided with a taking lens 11 which is movable back and forth along the optical axis 12 thereof. Behind the taking lens 11 is provided a mirror 13 which is inclined at 45° with respect to the optical axis 12 of the taking lens 11. The mirror 13 reflects light from the taking lens 11 upward toward a focusing plate 14 horizontally oriented above the mirror 13.

Above the focusing plate 14 is provided a roof prism 15 to reflect light from the focusing plate 14 forward in parallel to the focusing plate 14 and reverse the right and left of the image. The term "roof prism" is used herein as meaning having a prism with reflecting surfaces which are roof-shaped as shown in the drawings. See FIGS. 2, 3, 5 and 6. That prism has a rectangular entrance face and two longitudinal reflecting surfaces. One longitudinal edge of each reflecting surface extends along one edge of the other reflecting surface. The long longitudinal edges of the reflecting surface extends respectively along the opposite edges of the entrace face. The prism 15 is cemented to a step shaped prism 16 which has an entrance face 16a extending in parallel to the focusing plate 14 and an exit face 16b extending in perpendicular to the optical axis of light reflected by prism 15. The prism and the step shaped prism 16 are provided in a light tight angled casing 17 having an entrance opening and an exit opening. The step shaped prism 16 may be formed integral with the prism 15. The lower end of the casing 17 is demountably fixed to the camera body 10 and the other end thereof is provided on the outer face with an annular groove 17a.

A rotatable light tight casing 18 including therein a plane mirror 19 inclined at 45° with respect to the optical axis of the light reflected by prism 15 is rotatably mounted on the end of the angled casing 17. The casing 18 is provided with an inwardly extending flange 18b slidably engaged with said annular groove 17a so that the casing 18 may be rotated about the optical axis of the light from prism 15. The rotatable casing 18 further has a magnifier 20 at a position to receive the light reflected by the mirror 19. The rotatable casing 18 is rotatable at least by 90° from a position where the mirror 19 provided therein reflects light from the prism 15 upwardly as shown in FIG. 1. The rotatable casing 18 may be selectively retained in either of two positions in one of which the mirror 19 reflects the light upwardly as shown in FIG. 1 and in the other of which it reflects the light in a horizontal direction in FIG. 1.

Figure 2:
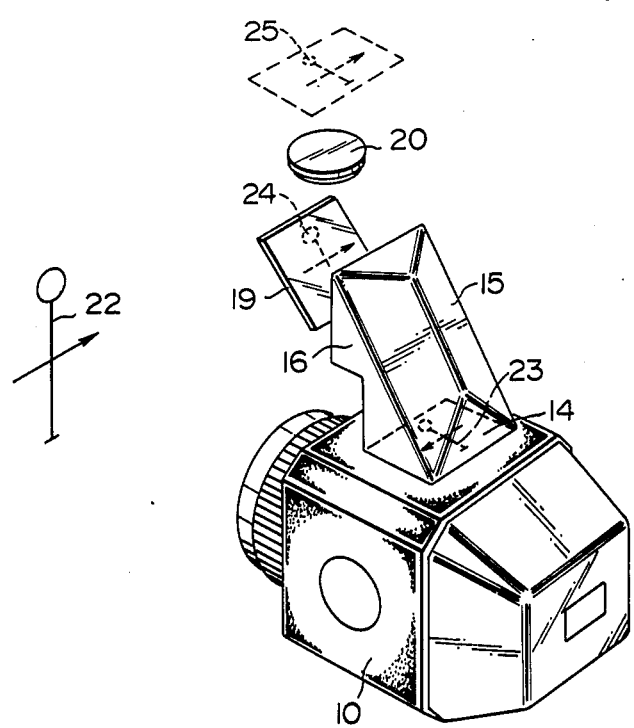
FIG. 2 is a somewhat schematic perspective view of the embodiment with a camera body wherein the view finder is in the normal vertical position.

FIG. 2 shows the normal vertical position of the view finder as shown in FIG. 1 and the camera. An object 22 to be photographed is focused as an image 23 on the focusing plate 14. The image 23 is a mirror image in which right and left are reversed. The image 23 is then inversed by prism 15. Thus, an erecting and non-mirror image 24 is reflected by the mirror 19 and viewed through the magnifier 20 as an erecting and non-mirror image 25.

Figure 3:
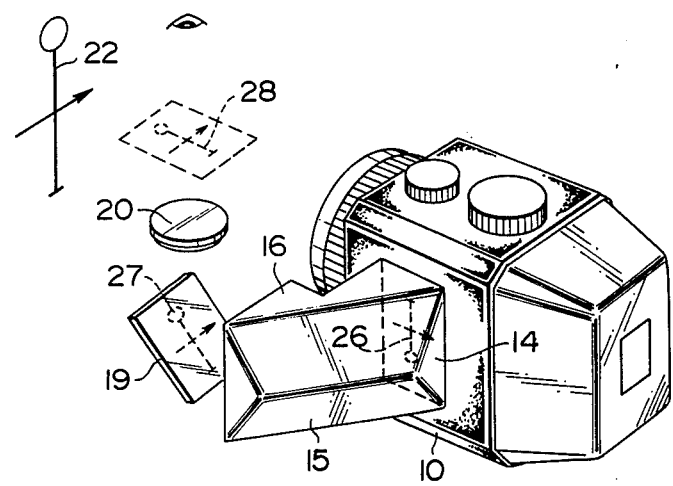
FIG. 3 is a somewhat schematic perspective view of the embodiment wherein the view finder is in the sideways position.

FIG. 3 shows the sideways position. The object 22 is focused as an inverted mirror image 26 on the focusing plate 14. The inverted mirror image 26 is then erected by prism 15 to an erecting image 27 and then reflected by the mirror 19 upward to be viewed through the magnifier 20 as an erecting non-mirror image 28.

Figure 4:
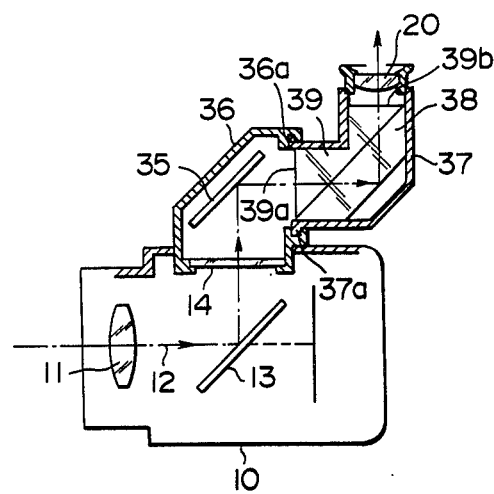
FIG. 4 is a somewhat schematic vertical sectional view showing a second embodiment of the view finder in accordance with the present invention.

A second embodiment of the present invention will now be described in detail with reference to FIGS. 4 to 6. The camera shown is of the same type as shown in FIGS. 1 to 3 wherein those elements as shown in FIGS. 1 to 3 are indicated with the same reference numerals. Above the focusing plate 14 is located a mirror 35 which reflects light from the mirror 13 backward in parallel to the optical axis of the taking lens 11 of the camera. The mirror 35 is provided in a light tight casing 36 which has an annular groove 36a around an opening on the rear end thereof. An inwardly extending flange 37a of an angled casing 37 provided on the front end thereof is rotatably engaged with the groove 36a. Within the angled casing 37 is provided a dach prism 38 which reflects the light from the mirror 35 at right angle. A magnifier 20 is provided optically behind roof prism mirror 38. Similarly to the first embodiment, a step shaped prism 39 having an entrance face 39a extending perpendicularly to the optical axis of the light from the mirror 35 and an exit face 39b extending perpendicularly to the optical axis of the light reflected by prism 38 is cemented to the dach prism 38.

Figure 5:
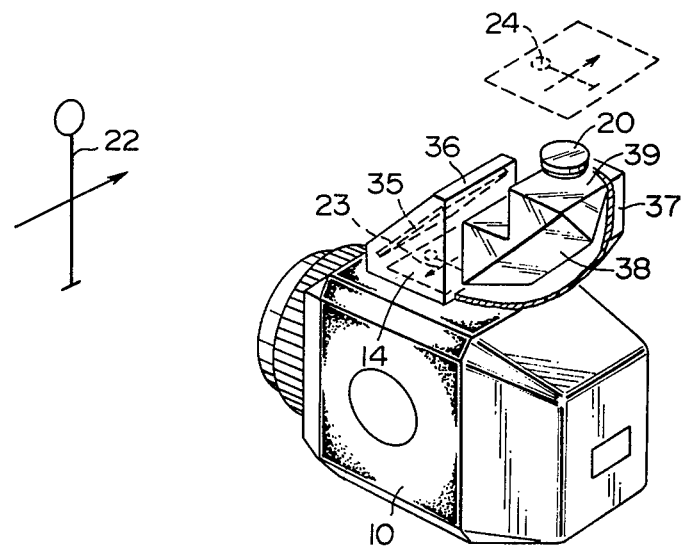
FIG. 5 is a somewhat schematic perspective view of the second embodiment wherein the view finder is in the normal vertical position.

In the normal vertical position, as shown in FIG. 5, the image of an object 22 is focused on the focusing plate 14 as an erecting mirror image 23. The image 23 is reflected by the mirror 35 and then the mirror image of the image 23, namely a non-mirror image of the object 22 is viewed through the magnifier 20 by way of the dach prism 38.

Figure 6:
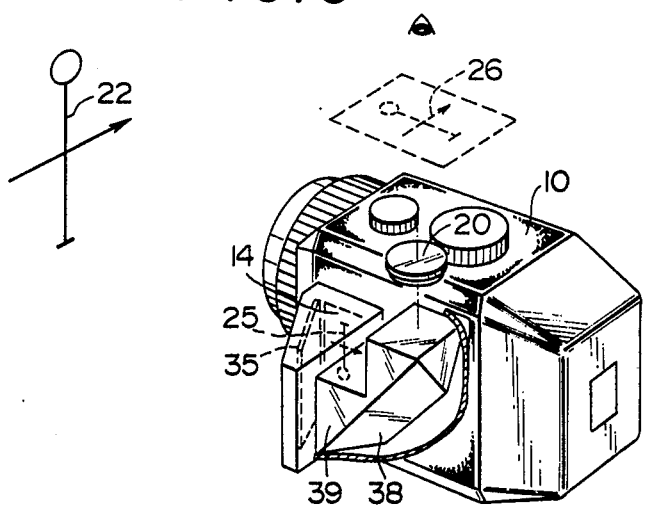
FIG. 6 is a somewhat schematic perspective view of the embodiment wherein the view finder is in the sideways position.

In the sideways position, as shown in FIG. 6, the image of the object 22 is focused on the focusing plate 14 as an inverted mirror image 25. The image 25 is reflected by the mirror 35 and then reflected by roof prism 38 which is rotated by 90° about the optical axis of the light reflected by the mirror 35, whereby an erecting non-mirror image 26 is viewed through the magnifier 20.

We claim:

1. A view finder for a reflex camera in which a mirror is provided in a camera body to reflect light coming through the taking lens thereof at a right angle and a focusing plate is provided at a right angle with respect to the optical axis of the light reflected by the mirror, said view finder comprising a first relecting means provided above the focusing plate of the camera to reflect at a right angle the light from the focusing plate along a path parallel to the optical axis of the taking lens, second reflecting means positioned optically behind said first reflecting means to reflect at a right angle the light from said first reflecting means, means for connecting the second reflecting means to the first reflecting means allowing the second reflecting means to take two positions with respect to the first reflecting means, said two positions being angularly different by 90°, in one of said two positions the second reflecting means reflecting the light from the first reflecting means in the direction parallel to the optical axis of the light reflected by the mirror in the camera, and in the other position the second reflecting means reflecting said light at right angle in the direction at right angle with respect to said direction, and a magnifier located optically behind said second reflecting means, wherein the improvement comprising either said first reflecting means or said second reflecting means having a roof prism to reverse the right and left of the image reflected thereby.

2. A view finder for a reflex camera as defined in claim 1 wherein said first reflecting means is a roof prism having an entrance face extending perpendicular to the optical axis of the light reflected by said mirror in the camera body and an exit face extending perpendicular to the optical axis of the light reflected by said first reflecting means.

3. A view finder for a reflex camera as defined in claim 1 wherein said second reflecting means is a roof prism having an entrance face extending perpendicular to the optical axis of the light reflected by said first reflecting means and an exit face extending perpendicular to the optical axis of the light reflected by said second reflecting means.

4. A view finder for a reflex camera as defined in claim 1 wherein said first reflecting means is provided in a light-tight casing having an entrance opening and an exit opening and said second reflecting means is provided in a light tight casing having an entrance opening and an exit opening, the entrance opening of the casing in which the second reflecting means is provided is rotatably engaged with the exit opening of the casing in which the first reflecting means is provided.

5. A view finder for a reflex camera as defined in claim 4 wherein said two casings are rotatably engaged with each other at said openings by means of an annular groove and an inwardly extending flange.

6. A view finder for a reflex camera as defined in claim 4 wherein said casing in which the second reflecting means is provided is selectively mounted on said casing in which the first reflecting means is provided at two positions in which the casing is angularly rotated by 90°.

* * * * *